United States Patent Office 2,967,879
Patented Jan. 10, 1961

2,967,879

6-BENZOYL-2-CYCLOHEXYL-3-METHOXYPHENYL BENZOATE AND PROCESS OF PRODUCTION

Robert L. Hudson, Midland, Mich., assignor to The Dow Chemical Company, Midland, Mich., a corporation of Delaware No Drawing. Filed Sept. 22, 1958, Ser. No. 762,223

2 Claims. (Cl. 260—476)

The present invention is directed to the novel compound 6-benzoyl-2-cyclohexyl-3-methoxyphenyl benzoate, and a method for its preparation. The present compound corresponds to the formula

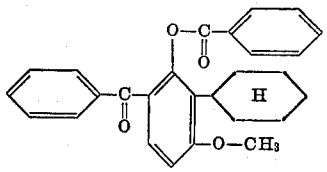

This compound is a crystalline solid soluble in many common organic solvents such as low-boiling petroleum fractions, acetone, and chlorinated hydrocarbons and of very low solubility in water. It is useful as an insecticide for control of domestic insects such as cockroaches, and as a herbicide adapted to be employed for the control of submerged or floating aquatic vegetation.

The novel compound may be prepared by reacting 2-cyclohexylresorcinol dimethyl ether with benzoyl chloride in the presence of a catalyst such as zinc chloride. Conveniently, the reaction may be carried out in an inert liquid reaction medium which may also be a reaction solvent, such as tetrachloroethane. Good results are obtained when employing approximately 2 molecular proportions of benzoyl chloride for each molecular proportion of 2-cyclohexylresorcinol dimethyl ether, and a catalytic amount of catalyst such as, for example, about 0.5 mole percent. The reaction is mildly exothermic, and takes place smoothly at temperatures in the range of from 20° to 75° C., higher temperatures in the range being employed to insure completion of the reaction.

In carrying out the reaction, the 2-cyclohexyl-resorcinol dimethyl ether, benzoyl chloride, zinc chloride catalyst, and tetrachloroethane reaction solvent are intimately mixed and blended together to prepare a reaction mixture. The resulting reaction mixture is maintained at approximately room temperature, with stirring, for a period of time to initiate reaction. Thereafter, the temperature is slowly raised, and eventually maintained near the upper limit of the reaction temperature range for a period of time to carry the reaction to completion. Upon completion of the reaction, the desired product may be separated from the reaction mixture in known manners. In one such manner, the reaction mixture may be water washed, the solvent removed by vaporization, and the product recrystallized from the resulting residue using petroleum ether as recrystallization solvent.

The following example illustrates the invention but is not to be considered as limiting it.

Example

Benzoyl chloride (29 grams; 0.20 mole), 2-cyclohexyl-resorcinol dimethyl ether (22 grams; 0.10 mole), and 0.4 gram of zinc chloride were intimately mixed and blended together in 200 milliliters of tetrachloroethane to prepare a reaction mixture. This mixture was maintained with stirring and at room temperature, approximately 20° C., for 17 hours. The temperature of the mixture was then gradually raised to and held at 50° C. for 6 hours with continued stirring; and thereafter, the stirring was continued and temperature of the reaction mixture raised to 75° C. and maintained thereat for 6 days. At the end of this reaction time, the resulting mixture was poured into ice water whereupon it divided into an aqueous phase and an organic product phase. The organic product phase was removed in a separatory funnel, tetrachloroethane solvent was removed therefrom by vaporization, the resulting product residue taken up in a petroleum ether fraction boiling at 60 to 70° C. and the product recrystallized therefrom. As a result of these operations there was obtained a white crystalline 6-benzoyl-2-cyclohexyl-3-methoxyphenyl benzoate product melting at 150.5–151.5° C.

The present compound is useful as a parasiticide and is especially adapted to be employed in the control of intestinal parasites of warm blooded animals. For such use, the unmodified compound may be employed. In an alternative procedure, the compound may be dispersed upon an inert finely divided solid and the resulting preparation employed as a feed additive, or enclosed in a capsule or compressed to form a bolus. Also, such preparations may be dispersed in water with or without a wetting agent, and the resulting aqueous dispersions employed as oral drenches or in drinking water. In other procedures, the compound may be employed in oil or as a constituent of oil-in-water or water-in-oil emulsions or aqueous dispersions thereof which may be employed as spray, drench, or wash. In a representative operation the feeding in unrestricted quantity of a balanced commercial laboratory animal diet modified by the inclusion therein of 6-benzoyl-2-cyclohexyl-3-methoxyphenyl benzoate in the concentration of 0.25 percent by weight over a period of 7 days to mice parasitized by tapeworms of the genus Hymenolepis and by *Ascaris lumbricoides suum* gave a 100 percent kill of the parasites without evident injury to the mice.

Various modifications of the process and products of the present invention may be made without departing from the spirit or scope thereof, and it is to be understood that I limit myself only as defined in the appended claims.

I claim:

1. 6-benzoyl-2-cyclohexyl-3-methoxyphenyl benzoate.
2. A method of preparing 6-benzoyl-2-cyclohexyl-3-methoxyphenyl benzoate which comprises reacting, in the presence of zinc chloride and at a temperature of from 20° to 75° C., two molecular portions of benzoyl chloride and one molecular proportion of 2-cyclohexylresorcinol dimethyl ether.

References Cited in the file of this patent

Amin et al.: J. Indian Chem. Soc., 25, 378–9 (1948).
Van Allen et al.: J. Org. Chem., 19, 1243–4 (1954).